(12) United States Patent
Kim et al.

(10) Patent No.: US 11,681,387 B2
(45) Date of Patent: Jun. 20, 2023

(54) TOUCH SENSOR LAMINATE AND IMAGE DISPLAY DEVICE

(71) Applicant: DONGWOO FINE-CHEM CO., LTD., Jeollabuk-do (KR)

(72) Inventors: Ji Yeon Kim, Gyeonggi-do (KR); Myeong Won Lee, Seoul (KR); Gwang Yong Tak, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 211 days.

(21) Appl. No.: 17/386,523

(22) Filed: Jul. 27, 2021

(65) Prior Publication Data

US 2021/0357064 A1   Nov. 18, 2021

Related U.S. Application Data

(63) Continuation of application No. PCT/KR2020/001063, filed on Jan. 22, 2020.

(30) Foreign Application Priority Data

Jan. 28, 2019  (KR) .................. 10-2019-0010554
Jan. 20, 2020  (KR) .................. 10-2020-0007554

(51) Int. Cl.
*G06F 3/041*       (2006.01)
*B32B 7/12*        (2006.01)
(Continued)

(52) U.S. Cl.
CPC .............. *G06F 3/0412* (2013.01); *B32B 7/12* (2013.01); *B32B 27/36* (2013.01);
(Continued)

(58) Field of Classification Search
CPC .................. G06F 3/0412; G06F 3/0443; G06F 2203/04102; G06F 2203/04111;
(Continued)

(56) References Cited

U.S. PATENT DOCUMENTS 10,889,897 B2 *   1/2021   Tsukamoto ............. B32B 9/045
2017/0355173 A1 * 12/2017  Tanaka .................... B32B 27/30
(Continued)

FOREIGN PATENT DOCUMENTS

JP       2014-198811 A     10/2014
KR    10-2015-0078001 A    7/2015
(Continued)

OTHER PUBLICATIONS

International Search Report for PCT/KR2020/001063 dated May 8, 2020.

*Primary Examiner* — Thuy N Pardo
(74) *Attorney, Agent, or Firm* — The PL Law Group, PLLC

(57) ABSTRACT

A touch sensor laminate according to an embodiment of the present invention includes a lower structure, a touch sensor layer stacked on the lower structure, an adhesive layer stacked on the touch sensor layer and having a Young's Modulus from 0.05 to 1 MPa, and an optical layer stacked on the adhesive layer. The touch sensor laminate has a thickness ratio of a predetermined range to provide improved folding durability.

11 Claims, 2 Drawing Sheets

(51) Int. Cl.
*B32B 27/36* (2006.01)
*G06F 3/044* (2006.01)

(52) U.S. Cl.
CPC ..... *B32B 2307/54* (2013.01); *B32B 2457/208* (2013.01); *G06F 3/0443* (2019.05); *G06F 2203/04102* (2013.01)

(58) Field of Classification Search
CPC ........... G06F 3/041; B32B 7/12; B32B 27/36; B32B 2307/54; B32B 2457/208; B32B 27/08; B32B 2307/748; B32B 3/085; B32B 27/325; B32B 2255/10; B32B 2255/26; B32B 2307/546; B32B 2307/732; B32B 23/20; B32B 27/281; B32B 27/286; B32B 27/306; B32B 27/365
USPC ......................................... 345/173, 156, 174
See application file for complete search history.

(56) References Cited

U.S. PATENT DOCUMENTS

| | | | |
|---|---|---|---|
| 2018/0074551 A1* | 3/2018 | Hong | B32B 37/12 |
| 2018/0258332 A1* | 9/2018 | Song | C09J 183/04 |
| 2018/0314352 A1* | 11/2018 | Wang | G06F 3/03547 |
| 2018/0364835 A1* | 12/2018 | Kwon | B32B 27/325 |
| 2019/0016101 A1* | 1/2019 | Tsukamoto | B32B 9/005 |
| 2020/0147932 A1* | 5/2020 | Baby | B32B 17/10018 |
| 2020/0247092 A1* | 8/2020 | Matsushita | H05B 33/02 |
| 2020/0261713 A1* | 8/2020 | Seeley | A61N 1/05 |
| 2022/0242074 A1* | 8/2022 | Takata | B29D 11/00865 |

FOREIGN PATENT DOCUMENTS

| | | |
|---|---|---|
| KR | 10-2016-0124541 A | 10/2016 |
| KR | 10-2017-0059277 A | 5/2017 |
| KR | 10-2018-0034282 A | 4/2018 |
| KR | 10-1923438 B1 | 11/2018 |

* cited by examiner

TOUCH SENSOR LAMINATE AND IMAGE DISPLAY DEVICE

CROSS-REFERENCE TO RELATED APPLICATION AND CLAIM OF PRIORITY

The present application is a continuation application to International Application No. PCT/KR2020/001063, filed Jan. 22, 2020 which claims priority to the benefit of Korean Patent Applications No. 10-2019-0010554 filed on Jan. 28, 2019 and No. 10-2020-0007554 filed on Jan. 20, 2020 in the Korean Intellectual Property Office, the entire contents of which are incorporated herein by reference.

BACKGROUND

1. Field

The present invention relates to a touch sensor, a touch sensor laminate and an image display device. More particularly, the present invention relates to a touch sensor laminate and an image display device including a touch sensor layer and an optical layer.

2. Description of the Related Art

As information technologies are being developed, various demands in display devices having thinner dimension, light-weight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel capable of inputting a user's direction by selecting an instruction displayed on a screen with a finger or an inputting tool is combined with the display device so that display and information input functions may be implemented in one electronic device.

As a flexible display capable of being folded or bent has been recently developed, a flexibility is also required to a touch panel applied to the flexible display.

However, conductive structures such as sensing electrodes and insulating structures are distributed in the same layer or in different layers of the touch panel, and thus defects such as electrode cracks and electrode peeling may be caused when folding or bending occurs.

For example, Korean Registered Patent Publication No. 10-1923438 discloses an image display device combined with a touch panel, but does not suggest adjustment of flexible properties as described above.

SUMMARY

According to an aspect of the present invention, there is provided a touch sensor laminate having improved flexibility and mechanical reliability.

According to an aspect of the present invention, there is provided an image display device having improved flexibility and mechanical reliability.

The above aspects of the present invention will be achieved by one or more of the following features or constructions:

(1) A touch sensor laminate, including: a lower structure; a touch sensor layer stacked on the lower structure; an adhesive layer stacked on the touch sensor layer and having a Young's Modulus from 0.05 to 1 MPa; and an optical layer stacked on the adhesive layer, wherein a thickness ratio represented by Equation 1 is in a range from 12 to 23%:

$$|A-B|*100/B(\%) \qquad \text{[Equation 1]}$$

In Equation 1, A is a height from a top surface of the optical layer to an interface of the touch sensor layer and the adhesive layer, and B is ½ of a total thickness of the touch sensor laminate.

(2) The touch sensor laminate according to the above (1), wherein the thickness ratio is from 17.7 to 21%.

(3) The touch sensor laminate according to the above (1), wherein the Young's modulus of the adhesive layer is from 0.05 to 0.25 MPa.

(4) The touch sensor laminate according to the above (1), wherein a peel strength of the adhesive layer with respect to the touch sensor layer is from 5 to 10 N/25 mm.

(5) The touch sensor laminate according to the above (1), wherein the lower structure includes a lower substrate and a lower adhesive layer formed between the lower substrate and the touch sensor layer.

(6) The touch sensor laminate according to the above (5), wherein the lower substrate includes a flexible display panel.

(7) The touch sensor laminate according to the above (1), wherein the optical layer includes a coating-type polarizer or a polarizing plate.

(8) The touch sensor laminate according to the above (1), wherein a central surface corresponding to ½ of the total thickness of the touch sensor laminate is included in the touch sensor layer.

(9) An image display device, including: a flexible display panel; a touch sensor layer stacked on the flexible display panel; an adhesive layer stacked on the touch sensor layer and having a Young's Modulus from 0.05 to 1 MPa; and an optical layer stacked on the adhesive layer, wherein a thickness ratio represented by Equation 1 is in a range from 12 to 23%:

$$|A-B|*100/B(\%) \qquad \text{[Equation 1]}$$

In Equation 1, A is a height from a top surface of the optical layer to an interface of the touch sensor layer and the adhesive layer, and B is ½ of a total thickness of the image display device.

(10) The image display device according to the above (9), further including a window substrate stacked on the optical layer.

(11) The image display device according to the above (9), wherein the thickness ratio is from 17.7 to 21%, and the Young's modulus of the adhesive layer is from 0.05 to 0.25 MPa.

In a touch sensor laminate according to embodiments of the present invention, an overall thickness of the laminate including a touch sensor layer, and a thickness of an optical layer and an adhesive layer may be controlled to prevent touch sensing failures due to electrode cracks and electrode damages of the touch sensor layer when folding the laminate.

Further, Young's modulus of the adhesive layer may be controlled to further improve mechanical reliability of the touch sensor layer during repeated folding.

The touch sensor laminate may be effectively applied to a flexible display having improved flexibility and operational reliability.

DETAILED DESCRIPTION OF THE EMBODIMENTS

According to exemplary embodiments of the present invention, there is provided a touch sensor laminate and an image display device which include a lower structure, a touch sensor layer, an adhesive layer and an optical layer to provide improved flexibility and durability.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
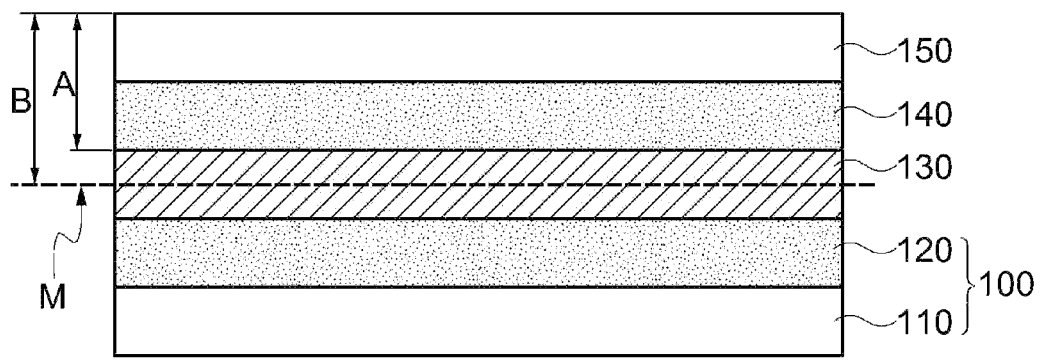
FIG. 1 is a schematic cross-sectional view illustrating a touch sensor laminate in accordance with exemplary embodiments.

FIG. 1 is a schematic cross-sectional view illustrating a touch sensor laminate in accordance with exemplary embodiments.

Referring to FIG. 1, the touch sensor laminate may include a touch sensor layer 130, an adhesive layer 140 and an optical layer 150 sequentially stacked on a lower structure 100.

The lower structure 100 may include an object on which the touch sensor layer 130 is formed, a substrate layer, a base layer, a substrate, etc. In exemplary embodiments, the lower structure 100 may include a lower substrate 110, and may include a lower adhesive layer 120 formed between the lower substrate 110 and the touch sensor layer 130.

The lower structure 100 or the lower substrate 110 may include a single-layered structure or a multi-layered structure. For example, the lower structure 100 may include a plurality of insulating layers or an insulating structure, and may include a multi-layered structure of an insulating layer and a conductive layer.

The lower substrate 110 may include a flexible substrate or a flexible panel having flexibility. In exemplary embodiments, the lower substrate 110 may include a flexible display panel.

The lower adhesive layer 120 may include, e.g., an optically clear adhesive (OCA) material known in the field of electronic materials.

The touch sensor layer 130 may include a plurality of sensing electrodes and an insulating layer. Structures and elements of the touch sensor layer 130 will be described later in more detail with reference to FIGS. 2 and 3.

The adhesive layer 140 may include, e.g., an acrylic or silicone-based pressure sensitive adhesive material. For example, an adhesive composition including an acrylate-based copolymer and/or monomer, a crosslinking agent and a solvent may be coated on a surface of the touch sensor layer 130 or the optical layer 150 and then photocured to form the adhesive layer 140.

The crosslinking agent may include, e.g., an isocyanate crosslinking agent. The adhesive composition may further include an additional component such as a silane coupling agent, an antistatic agent, etc.

The optical layer 150 may be attached to the touch sensor layer 130 by the adhesive layer 140. The optical layer 150 may include a polarizing layer, a retardation layer, a luminance enhancing layer, a refractive index matching layer, etc. included in the image display device for an image improvement. In exemplary embodiments, the optical layer 150 may include a polarizing layer, e.g., a coating-type polarizer or a polarizing plate.

The coating-type polarizer may include a liquid crystal coating layer including a polymerizable liquid crystal compound and a dichroic dye. In this case, the optical layer 150 may further include an alignment layer for providing an orientation to the liquid crystal coating layer.

For example, the polarizing plate may include a polyvinyl alcohol-based polarizer and a protective film attached to at least one surface of the polyvinyl alcohol-based polarizer.

In FIG. 1, ½ of a total thickness of the touch sensor laminate is represented as B, and a height from a top surface of the touch sensor laminate (e.g., a top surface of the optical layer 150) to an interface between the touch sensor layer 130 and the adhesive layer 140 is represented as A.

In the touch sensor laminate, a thickness ratio expressed by Equation 1 below may be adjusted within a predetermined range.

$$|A-B|*100/B(\%) \qquad \text{[Equation 1]}$$

In exemplary embodiments, the thickness ratio value of the touch sensor stack represented by Equation 1 may be from about 12 to 23%. Within the thickness ratio range, durability when being folded may be improved by a thickness balancing of upper and lower portions of the touch sensor laminate.

Additionally, Young's Modulus of the adhesive layer 140 may be in a range from about 0.05 to 1 MPa. For example, when the Young's modulus of the adhesive layer 140 is less than about 0.05 MPa, a strength of the adhesive layer 140 may be excessively reduced, and sufficient shock absorption for the touch sensor layer 120 may not be implemented. When the Young's modulus of the adhesive layer 140 exceeds about 1 MPa, sufficient flexibility and elasticity may not be provided from the adhesive layer 140.

The Young's modulus of the adhesive layer 140 may be adjusted, e.g., by changing a content of the crosslinking agent, a curing time of the photocuring process or an amount of light irradiation in the photocuring process.

In exemplary embodiments, the thickness ratio of the touch sensor laminate and the Young's modulus of the adhesive layer 140 may be controlled together to improve mechanical stability in the touch sensor layer 130 when being folded or bent while ensuring sufficient flexible properties.

Preferably, the thickness ratio of the touch sensor laminate represented by Equation 1 may be from about 17.7 to 21%. Additionally, the adhesive layer 140 may have a Young's modulus of about 0.05 to 0.25 MPa.

In some embodiments, a central surface M corresponding to ½ of the total thickness of the touch sensor laminate may be included in the touch sensor layer 130 as indicated by a dotted line in FIG. 1. Accordingly, stress in the touch sensor layer 130 may be effectively dispersed to suppress breakage and cracks of electrodes in the touch sensor layer 130.

In some embodiments, a peel strength of the adhesive layer 140 with respect to the touch sensor layer 130 may be from about 5 to 10 N/25 mm. Within the above range, when a folding stress is applied to the touch sensor laminate, the folding stress may be sufficiently dispersed in the adhesive layer 140 without causing a peel-off of the touch sensor layer 130. Accordingly, electrode cracks in the touch sensor layer 130 may be more effectively suppressed.

Figure 2:
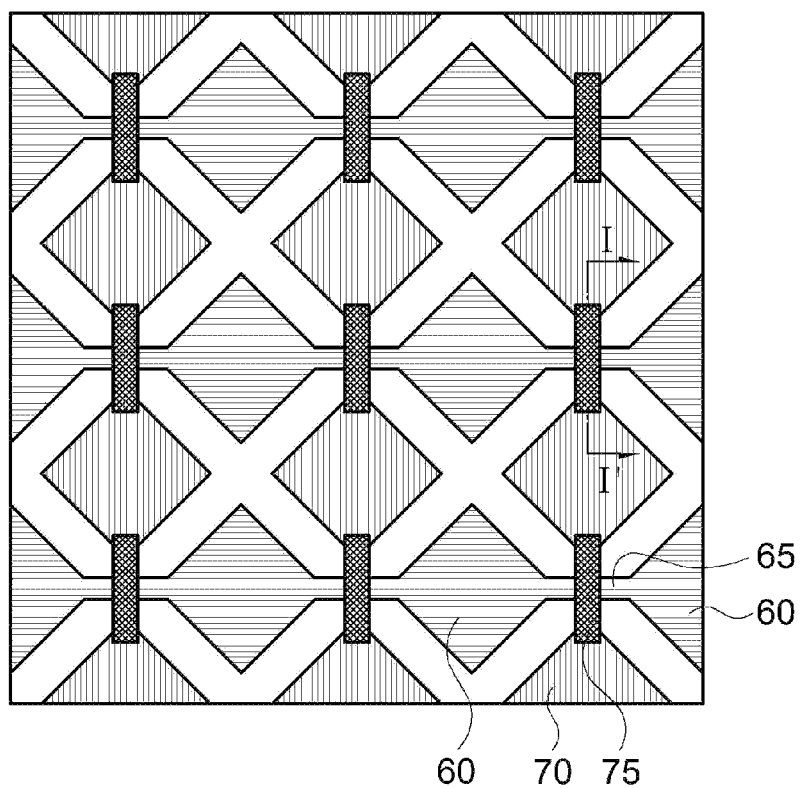
FIGS. 2 and 3 are a schematic top planar view and a schematic cross-sectional view, respectively, illustrating a construction of a touch sensor layer included in a touch sensor laminate in accordance with exemplary embodiments.
Figure 3:
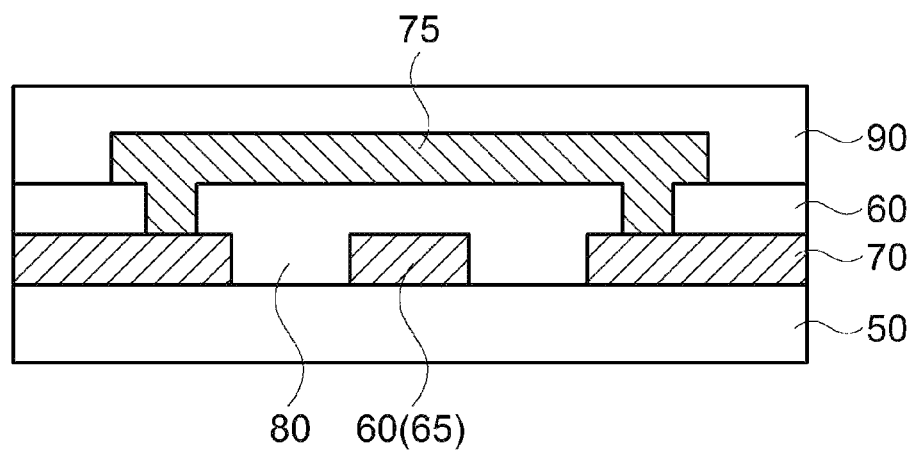

FIGS. 2 and 3 are a schematic top planar view and a schematic cross-sectional view, respectively, illustrating a construction of a touch sensor layer included in a touch sensor laminate in accordance with exemplary embodiments. Specifically, FIG. 3 is a cross-sectional view taken along line I-I' of FIG. 2.

Referring to FIGS. 2 and 3, the touch sensor layer 130 may include sensing electrodes arranged on a support layer 50.

The support layer 50 may include, e.g., a cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), polymethyl methacrylate (PMMA), or the like.

The sensing electrodes may include sensing electrodes arranged in different directions in a planar view. For example, first sensing electrode 60 (e.g., arranged along an X direction) and second sensing electrode 70 (e.g., arranged along a Y direction) may be arranged to cross each other.

The first sensing electrode 60 and the second sensing electrode 70 may provide an information of an X coordinate and a Y coordinate of a touched point, respectively. For example, when a human hand or an object is input onto the touch sensor laminate, an electrical signal may be generated by a change in capacitance from the first sensing electrode 60 and the second sensing electrode 70. The electrical signal may be transmitted to a driving circuit via, e.g., a position detection line.

Each of the second sensing electrodes 70 may have an island shape spaced apart from each other. The first sensing electrodes 60 may be integrally connected to each other by a connector 65 along a row direction (e.g., the X direction).

When the first sensing electrode 60 and the second sensing electrode 70 are disposed at the same level, a bridge electrode 75 may be further formed to connect the second sensing electrodes 70 while being insulated from the first sensing electrodes 60. The bridge electrode 75 may electrically connect the second sensing electrodes 70 adjacent to each other in a column direction (e.g., the y-direction).

As illustrated in FIG. 3, an insulating layer 80 may at least partially cover the sensing electrodes 60 and 70. In some embodiments, the insulating layer 80 may cover the first sensing electrode 60 or the connector 65, and may partially cover the second sensing electrodes 70. For example, the insulating layer 80 may include a contact hole partially exposing a top surface of the second sensing electrode 70.

The insulating layer 80 may be formed of a transparent insulating material. For example, the insulating layer 80 may be formed using an inorganic insulating material such as silicon oxide or a transparent organic material such as an acrylic resin.

The bridge electrode 75 may be disposed on the insulating layer 80 to electrically connect a pair of adjacent second sensing electrodes 70 to each other. For example, the bridge electrode 75 may cross the connector 65 on the insulating layer 80. The bridge electrode 75 may fill the contact holes formed in the insulating layer 80.

The sensor electrodes 60 and 70 and the bridge electrode 75 may include a transparent conductive oxide or a metal. The transparent conductive oxide may include, e.g., indium tin oxide (ITO), indium zinc oxide (IZO), zinc oxide (ZnO), indium zinc tin oxide (IZTO), cadmium tin oxide (CTO), etc. The metal may include, e.g., silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), or an alloy containing at least one of the metals.

In some embodiments, the sensing electrodes 60 and 70 and/or the bridge electrode 75 may have a multi-layered structure. For example, the sensing electrodes 60 and 70 and/or the bridge electrode 75 may have a structure in which a transparent oxide layer and a metal layer are stacked.

In some embodiments, the first sensing electrode 60 and the second sensing electrode 70 may be formed at different levels. For example, one of the first sensing electrode 60 and the second sensing electrode 70 may be formed on the insulating layer 80 and the other may be formed under the insulating layer 80. In this case, the bridge electrode 75 may be omitted, and both the first sensing electrode 60 and the second sensing electrode 70 may include connectors.

In some embodiments, each of the sensing electrodes may be formed as an independent island pattern and may serve as an individual sensing domain.

Figure 4:
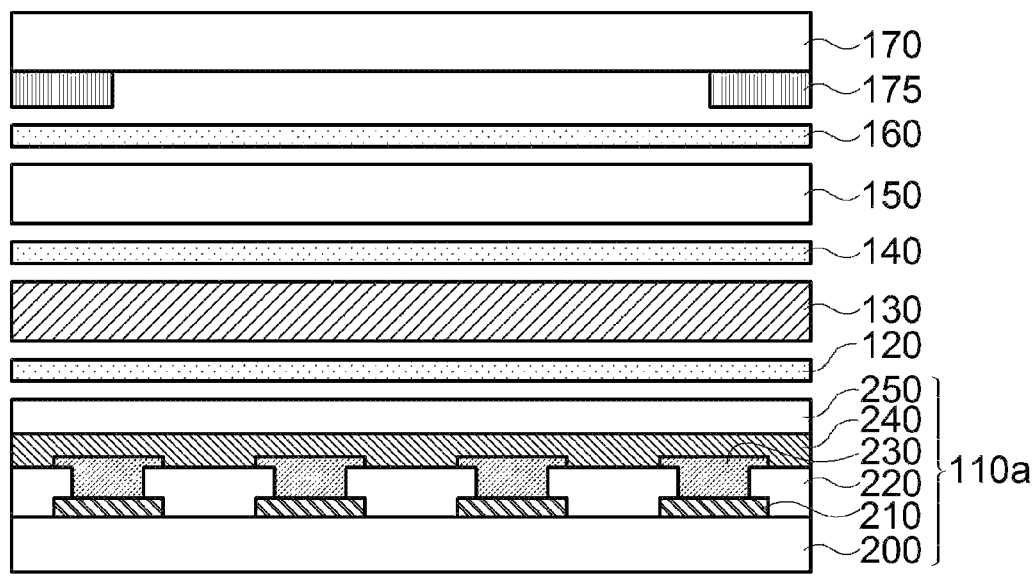
FIG. 4 is a schematic cross-sectional view illustrating an image display device in accordance with exemplary embodiments.

FIG. 4 is a schematic cross-sectional view illustrating an image display device in accordance with exemplary embodiments.

For example, in the touch sensor laminate illustrated in FIG. 1, the lower substrate 110 may include a flexible display panel. In this case, for example, a flexible display device as illustrated in FIG. 4 may be implemented.

Referring to FIG. 4, the image display device may include the lower adhesive layer 120, the touch sensor layer 130, the adhesive layer 140 and the optical layer 150 sequentially stacked on a flexible display panel 110a.

The flexible display panel 110a may include a pixel electrode 210, a pixel defining layer 220, a display layer 230, a counter electrode 240 and an encapsulation layer 250 disposed on a panel substrate 200.

A pixel circuit including a thin film transistor (TFT) may be formed on the panel substrate 200, and an insulating layer covering the pixel circuit may be formed. The pixel electrode 210 may be electrically connected to, e.g., a drain electrode of a TFT on the insulating layer.

The pixel defining layer 220 may be formed on the insulating layer to expose the pixel electrode 210 to define a pixel area. A display layer 230 may be formed on the pixel electrode 210, and the display layer 230 may include, e.g., a liquid crystal layer or an organic light emitting layer.

The counter electrode 240 may be disposed on the pixel defining layer 220 and the display layer 230. The counter electrode 240 may serve as, e.g., a common electrode or a cathode of the image display device. The encapsulation layer 250 for protecting the flexible display panel 110a may be stacked on the counter electrode 240.

The thickness ratio value of Equation 1 may also be satisfied in the image display device. Further, the adhesive layer 140 may have Young's modulus within the above-described range also in the image display device.

In some embodiments, a window substrate 170 may be stacked on the optical layer 150 via an upper adhesive layer 160.

The window substrate 170 may include, e.g., a hard coating film. In an embodiment, a light-shielding pattern 175 may be formed on a peripheral portion of one surface of the window substrate 170. The light-shielding pattern 175 may include, e.g., a color-printed pattern, and may have a single-layered or multi-layered structure. A bezel portion or a non-display area of the image display device may be defined by the light-shielding pattern 175.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

Experimental Example: Evaluation on Folding Durability

Touch sensor laminates of Examples and Comparative Examples in which a PET film-OCA layer-touch sensor layer-adhesive layer (PSA layer)-polarizing plate were sequentially stacked were prepared having thickness ratios as shown in Table 1 below.

The Young's modulus of the adhesive layer was controlled by changing a light irradiation amount and a light irradiation time for curing the PSA layer. The Young's Modulus of the adhesive layer used in each touch sensor laminate was measured using an AG-Xplus tester (Shimadzu Co, Ltd.).

Specifically, a sample cut into a rectangle of 20 mm×50 mm of the PSA layer was fixed to a clamp of the AG-Xplus tester. Thereafter, the sample was fixed so that a length of the sample being pulled was 5 cm, and the Young's modulus was measured in a state of being pulled upwardly at a tensile rate of 20 mm/min under an environment of a temperature of 23° C. and a relative humidity of 55%.

A peel strength of the adhesive layer to the touch sensor was measured using AG-IS (manufactured by SHIMADZU). Specifically, the adhesive layer was attached on the touch sensor, and then cut into a size of 150 mm×25 mm using a super cutter to form a sample. A lead wire was formed on the adhesive layer of the cut sample, and the lead wire was fixed to an upper clamp. The touch sensor was fixed to a lower clamp. Thereafter, while the upper clamp was moved, the adhesive layer was peeled by 180 degrees to measure the peel strength. The peel strength was obtained by an average value of remaining sections except for values of an initial 20% section.

Each of the touch sensor laminates of Examples and Comparative Examples was folded (out-folded) repeatedly so that an outer surface of the display panel was folded outwardly with a radius of curvature of 2R to 5R using CFT-120 (Cobotec Co., Ltd.) equipment. The folding durability was evaluated as follows.

<Evaluation Criteria>

S: After folding more than 200,000 times, a touch sensor function was performed normally.

⊚: Normal operation of a touch sensor function after folding more than 150,000 times and less than 200,000 times ○: Normal operation of touch sensor function after folding more than 50,000 times and less than 100,000 times Δ: Normal operation of touch sensor function after folding 10,000 times, and touch sensor failure after folding 20,000 times X: Touch sensor failure after folding 10,000 times The evaluation results are shown together in Table 1 below. In Table 1, the thickness of each layer was described in an order of the polarizing plate-PSA layer-touch sensor layer-OCA layer-PET film.

TABLE 1

|  | Thickness ratio of Equation 1 (%) | Young's Modulus of Adhesive layer (MPa) | Peel Strength of Adhesive layer (N/mm) | Folding Durability | Thickness of Each layer (μm) |
|---|---|---|---|---|---|
| Example 1 | 17.7 | 0.25 | 5 | S | 35-16-7-16-50 |
| Example 2 | 21 | 0.05 | 10 | S | 35-30-6.6-40-53 |
| Example 3 | 17.7 | 0.05 | 5 | S | 73-16-7.2-42-13 |
| Example 4 | 21 | 0.25 | 10 | S | 35-10-6.9-15-47 |
| Example 5 | 23 | 1 | 7 | ○ | 73-42-7-15-50 |
| Example 6 | 12 | 0.05 | 10 | ⊚ | 73-30-7-20-54 |
| Example 7 | 23 | 0.05 | 10 | ⊚ | 50-15-6.9-22-75 |
| Example 8 | 12 | 1 | 7 | ○ | 73-25-7-15-55 |
| Example 9 | 17.7 | 0.25 | 2 | ○ | 35-16-6.9-16-50 |
| Example 10 | 21 | 0.05 | 4.9 | ○ | 35-30-7.4-15-20 |
| Example 11 | 17.7 | 0.05 | 16 | ○ | 50-30-6.9-16-33 |
| Example 12 | 21 | 0.25 | 10.1 | ○ | 35-15-6.6-50-20 |
| Example 13 | 17.6 | 0.05 | 5 | ⊚ | 35-15-7-15-13 |
| Example 14 | 17.6 | 0.25 | 5 | ⊚ | 50-15-6.5-25-14 |
| Example 15 | 21.1 | 0.05 | 10 | ⊚ | 73-15-7.3-15-35 |
| Example 16 | 21.1 | 0.25 | 10 | ⊚ | 50-30-7.1-30-15 |
| Comparative Example 1 | 23.1 | 1 | 7 | Δ | 50-30-7-30-13 |
| Comparative Example 2 | 11.9 | 0.05 | 10 | Δ | 35-30-7.2-30-14 |
| Comparative Example 3 | 18 | 1.1 | 5 | Δ | 35-30-7.2-15-23 |
| Comparative Example 4 | 23.1 | 1.1 | 5 | × | 35-10-7-15-50 |
| Comparative Example 5 | 27.4 | 2 | 10 | × | 35-35-6.9-46-70 |

Referring to Table 1, when the thickness ratio and Young's modulus of the adhesive layer according to the above-described exemplary embodiments were satisfied, a normal touch sensing function was provided even when being folded more than 50,000 times. However, as shown in Comparative Examples, when at least one of the thickness ratio and the Young's modulus of the adhesive layer was not satisfied, the folding durability was rapidly decreased.

What is claimed is:

1. A touch sensor laminate, comprising:
a lower structure;
a touch sensor layer stacked on the lower structure;
an adhesive layer stacked on the touch sensor layer and having a Young's Modulus from 0.05 to 1 MPa; and
an optical layer stacked on the adhesive layer,
wherein a thickness ratio represented by Equation 1 is in a range from 12 to 23%:

$$|A-B|*100/B(\%) \qquad \text{[Equation 1]}$$

wherein A is a height from a top surface of the optical layer to an interface of the touch sensor layer and the adhesive layer, and B is ½ of a total thickness of the touch sensor laminate.

2. The touch sensor laminate according to claim 1, wherein the thickness ratio is from 17.7 to 21%.

3. The touch sensor laminate according to claim 1, wherein the Young's modulus of the adhesive layer is from 0.05 to 0.25 MPa.

4. The touch sensor laminate according to claim 1, wherein a peel strength of the adhesive layer with respect to the touch sensor layer is from 5 to 10 N/25 mm.

5. The touch sensor laminate according to claim 1, wherein the lower structure comprises a lower substrate and a lower adhesive layer formed between the lower substrate and the touch sensor layer.

6. The touch sensor laminate according to claim 5, wherein the lower substrate comprises a flexible display panel.

7. The touch sensor laminate according to claim 1, wherein the optical layer comprises at least one of a coating-type polarizer and a polarizing plate.

8. The touch sensor laminate according to claim 1, wherein a central surface corresponding to ½ of the total thickness of the touch sensor laminate is included in the touch sensor layer.

9. An image display device, comprising:
a flexible display panel;
a touch sensor layer stacked on the flexible display panel;
an adhesive layer stacked on the touch sensor layer and having a Young's Modulus from 0.05 to 1 MPa; and
an optical layer stacked on the adhesive layer,
wherein a thickness ratio represented by Equation 1 is in a range from 12 to 23%:

$$|A-B|*100/B(\%) \qquad \text{[Equation 1]}$$

wherein A is a height from a top surface of the optical layer to an interface of the touch sensor layer and the adhesive layer, and B is ½ of a total thickness of the image display device.

10. The image display device according to claim 9, further comprising a window substrate stacked on the optical layer.

11. The image display device according to claim 9, wherein the thickness ratio is from 17.7 to 21%, and the Young's modulus of the adhesive layer is from 0.05 to 0.25 MPa.

* * * * *